(12) United States Patent
Murata

(10) Patent No.: US 6,669,797 B2
(45) Date of Patent: *Dec. 30, 2003

(54) MANUFACTURING METHOD FOR POLARIZING CONVERSION ELEMENTS

(75) Inventor: Masami Murata, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/105,408

(22) Filed: Mar. 26, 2002

(65) Prior Publication Data

US 2002/0096250 A1 Jul. 25, 2002

Related U.S. Application Data

(63) Continuation of application No. 09/609,069, filed on Jun. 30, 2000, now Pat. No. 6,436,214.

(30) Foreign Application Priority Data

Jul. 5, 1999 (JP) .......................................... 11-189996

(51) Int. Cl.$^7$ .............................. B32B 31/00; G02B 5/30
(52) U.S. Cl. ..................... 156/99; 156/106; 156/154; 156/267; 156/256; 359/485; 359/487; 359/495; 359/497; 359/385; 359/389; 359/360
(58) Field of Search ........................ 156/99, 106, 159, 156/267, 256, 101, 270; 359/485, 487, 495, 497, 385, 389, 360

(56) References Cited

U.S. PATENT DOCUMENTS

| | | | |
|---|---|---|---|
| 5,109,898 A | 5/1992 | Schacht | 144/350 |
| 5,978,136 A | 11/1999 | Ogawa et al. | 359/487 |
| 6,404,550 B1 | 6/2002 | Yajima | 359/487 |
| 6,436,214 B1 * | 8/2002 | Murata | 156/99 |

FOREIGN PATENT DOCUMENTS

CN 1172956 2/1998

* cited by examiner

Primary Examiner—Linda Gray
(74) Attorney, Agent, or Firm—Oliff & Berridge, PLC

(57) ABSTRACT

A number of k sets of light transmissive members are prepared, k being an integer of 2 or greater, where each set thereof may consist of a plurality of first light transmissive plates and a plurality of second light transmissive plates, and (K+1) third light transmissive plates having a greater thickness than those of the first and the second light transmissive plate. A composite plate member is produced by alternately arranging and bonding one set of the plurality of first light transmissive plates and the plurality of second light transmissive plates to each of the spaces between the (K+1) third light transmissive plates, and alternately arranging a plurality of polarization separating films and a plurality of reflecting films on each interface in the composite plate member. A block substrate having a light receiving surface and a light emitting surface is produced by cutting the composite plate member along a first section parallel to a surface inclining at a predetermined angle with the surface of the composite plate member, the light receiving and light emitting surfaces being parallel to the first section. The light receiving surface and the light emitting surface of the block substrate are polished, and k light transmissive blocks are produced from one block substrate by dividing the block substrate at the positions of the third light transmissive plates disposed inside the block substrate.

24 Claims, 9 Drawing Sheets

CONVENTIONAL ART

CONVENTIONAL ART

MANUFACTURING METHOD FOR POLARIZING CONVERSION ELEMENTS

This is a Continuation of Application Ser. No 09/609,069 filed Jun. 30, 2000, now U.S. Pat. No. 6,436,214. The entire disclosure of the prior application(s) is hereby incorporated by reference herein in its entirety.

BACKGROUND OF THE INVENTION

1. Field of Invention

The present invention relates to a manufacturing method for a polarizing conversion element for converting incident non-polarized light into specified polarized light.

2. Description of Related Art

In a projector, a light-modulating device for modulating light corresponding to image signals is used. As the light-modulating device, the type of using only one type of linear polarized light, such as a transmissive liquid crystal panel and a reflective liquid crystal panel, is usually used. In the projector which only uses such one type of linear polarized light, a polarizing conversion element for converting emitted non-polarized light from a light source into one type of a linear polarized light component (S-polarized light component or P-polarized light component, for example) is provided.

FIGS. 8(A)–(B) are schematic representations showing a polarizing conversion element 320. FIG. 8(A) shows the polarizing conversion element 320 in the x-z plane, while FIG. 8(A) shows the polarizing conversion element 320 in the x-y plane.

The polarizing conversion element 320 may consist of a polarizing beam splitter array (polarized light separating element) 340 and a plurality of $\lambda/2$ phase films 381 selectively arranged on portions of emitting surface of the polarizing beam splitter array 340. The polarizing beam splitter array 340 has a height of h and a shape in which a plurality of column-shaped light transmissive members 324, each having a parallelogram cross-section, are sequentially bonded to each other, and column-shaped light transmissive members 325 and 326, each having a trapezoidal cross-section, are respectively bonded to the two ends of the bonded members 324. Polarization separating films 331 and reflecting films 332 are alternately formed on each of boundary surfaces between light transmissive members 324, 325, and 326. The $\lambda/2$ phase films 381 are selectively arranged at mapping portions in the x-direction of emitting light from the polarization separating film 331 or the reflecting film 332. In this example, the $\lambda/2$ phase films 381 are selectively arranged at mapping portions in the x-direction of emitting light from the polarization separating film 331.

The polarizing conversion element 320 separates incident light on the polarization separating film 331 into an S-polarized light component and a P-polarized light component. The S-polarized light is reflected by the polarization separating film 331 and is further reflected by the reflecting film 332 to be emitted therefrom. On the other hand, the P-polarized light component is allowed to pass through the polarization separating film 331 just as it is. On the emitting surface of the transmitted light from the polarization separating film 331, the $\lambda/2$ phase film 381 is arranged, whereby the P-polarized light component is transformed to the S-polarized light component to be emitted therefrom. Therefore, a set of the polarization separating film 331, the reflecting film 332, and the $\lambda/2$ phase film 381, which adjoin each other, corresponds to one polarizing conversion unit. In addition, the polarizing conversion element 320 in this example has three lines of polarizing conversion unit 350 and one line of dummy unit 350d. In such a manner, the polarizing conversion element 320 is an optical element for converting incident light on the polarization separating film 331 into substantially one kind of a linearly polarized light component.

SUMMARY OF THE INVENTION

FIG. 9 is a schematic representation showing a manufacturing example for the polarizing beam splitter array 340. In the polarizing beam splitter array 340, for example, a first glass plate 321 having the polarization separating film 331 and the reflecting film 332 formed thereon and a second glass plate 322 having no film formed thereon are alternately bonded to each other by an optical adhesive 327, so that the polarization separating film 331 and the reflecting film 332 are alternately arranged. Then, an ultra violet ray (UV ray) is irradiated thereon to cure the optical adhesive 327. At this time, third glass plates 323 having a different thickness from that of the first and the second glass plates 321 and 322 are used as first and the last plates of the bonded plates, to form a composite plate member 400. Light transmissive blocks are cut substantially in parallel with each other off the composite plate member 400 formed as above along sections (shown by broken lines in the drawing) inclining at the predetermined angle "θ" with the surface of the composite plate member 400, using a multi-wire saw or a multi-blade saw. The value "θ" is preferably about 45°. Here, "the surface of the composite plate member 400" indicates the surface of the third plates 323 bonded at the both ends. Protruding portions of both ends of the block are cut off by a dicing saw or a laser cutting apparatus so that the block has a substantially rectangular shape. Surfaces (cutting sections) of the light transmissive block cut in such a manner are polished to obtain the polarizing beam splitter array 340 (FIGS. 8(A)–(B)). In addition, portions formed by the first and the second glass plates 321 and 322 correspond to the light transmissive members 324, while one of the portions formed by the third glass plates 323 at one of the two ends corresponds to the light transmissive member 325, and the other thereof at the other end corresponds to the light transmissive member 326. The thickness of the third glass plate 323 corresponding to the light transmissive members 325 may be different from that of the third glass plate 323 corresponding to the light transmissive members 326.

In addition, the polarizing beam splitter array may be referred to as "a light transmissive block" below.

Conventionally, the polarizing conversion element has been manufactured in the manner described above to improve efficiency. However, a further improvement in manufacturing efficiency is desirable.

The present invention is made to at least solve the above-mentioned problems, and it is an object of the present invention to at least provide a technology to manufacture a polarizing conversion element more efficiently.

Accordingly, a first method for manufacturing a polarizing conversion element according to the present invention may consist of the steps of:

preparing k sets of light transmissive members, k being an integer of 2 or greater, where each of the sets may consist of a plurality of first light transmissive plates and a plurality of second light transmissive plates having substantially a same thickness as that of the first light transmissive plates;

preparing (K+1) third light transmissive plates having a greater thickness than those of the first light transmissive plates and the second light transmissive plates;

producing a composite plate member by alternately arranging and bonding one set of the plurality of first light transmissive plates and the plurality of second light transmissive plates to each of spaces between the (K+1) third light transmissive plates, and alternately arranging a plurality of polarization separating films and a plurality of reflecting films on each interface between the first light transmissive plates, the second light transmissive plates and third light transmissive plates in the composite plate member;

producing a block substrate having a light receiving surface and a light emitting surface by cutting the composite plate member along a first section parallel to a surface inclining at a predetermined angle with a surface of the composite plate member, the light receiving surface and the light emitting surface being in parallel to the first section;

polishing the light receiving surface and the light emitting surface of the block substrate; and producing k light transmissive blocks from the one block substrate by dividing the block substrate at positions of the third light transmissive plates disposed inside the block substrate.

A second method for manufacturing a polarizing conversion element according to the present invention may consist of the steps of:

preparing k sets of light transmissive members, k being an integer of 2 or greater, each of the sets comprising a plurality of first light transmissive plates and a plurality of second light transmissive plates;

preparing (K+1) third light transmissive plates having a greater thickness than those of the first light transmissive plates and the second light transmissive plates;

producing a composite plate member by alternately arranging and bonding one set of the plurality of first light transmissive plates and the plurality of second light transmissive plates to each of spaces between the (K+1) third light transmissive plates, and alternately arranging a plurality of polarization separating films and a plurality of reflecting films in each interface between the first light transmissive plates, the second light transmissive plates and the third light transmissive plates in the composite plate member;

producing a block substrate having a light receiving surface and a light emitting surface by cutting the composite plate member along a first section parallel to a surface inclining at a predetermined angle with a surface of the composite plate member, the light receiving surface and the light emitting surface being in parallel to the first section; and producing k light transmissive blocks from one of the block substrates by dividing the block substrate at positions of the third light transmissive plates that are disposed inside the block substrate.

In the conventional manufacturing method, 2·k third light transmissive plates have to be prepared in order to produce k light transmissive blocks. However, in the manufacturing methods according to the present invention, (K+1) third light transmissive plates are enough to be prepared, whereby the number of parts for producing the polarizing conversion element can be reduced, resulting in reduction in the manufacturing cost.

In particular, according to the first manufacturing method of the present invention, a block substrate including k light transmissive blocks per one substrate is produced from a composite plate member; after the produced block substrate is polished, k light transmissive blocks per one substrate can be produced. Thereby, the number of steps for cutting the composite plate member and polishing the light receiving and light emitting surfaces can be reduced to be 1/k compared with that in producing k light transmissive blocks by a conventional manufacturing method, so that the polarizing conversion element can be more efficiently manufactured than ever.

In addition, preparing the k sets of light transmissive members may preferably consist of forming the polarization separating film on a first surface of the first light transmissive plate, and forming a reflecting film on a second surface of the first light transmissive plate. Also, preferably, preparing the k sets of light transmissive members may consist of forming a polarization separating film on one surface of the first light transmissive plate, and forming a reflecting film on one surface of the second light transmissive plate.

In either way, a plurality of polarization separating films and a plurality of reflecting films can be alternately arranged on each interface between light transmissive plates.

The above-mentioned manufacturing methods may further consist of dividing a light transmissive block of the light transmissive blocks produced from the one of the block substrates into a plurality of light transmissive blocks by cutting the light transmissive block along a second section in parallel with a surface substantially perpendicular to a longitudinal direction of the plurality of polarization separating films and the plurality of reflecting films arranged inside the light transmissive block.

In this manner, a plurality of light transmissive blocks can be produced from one light transmissive block produced, thereby enabling the polarizing conversion element to be manufactured more efficiently.

Further, the polarizing conversion element manufactured by above methods may be employed by a projector. In this manner, resulting in reduction in the manufacturing cost for manufacturing the projector and enabling the projector to be manufactured more efficiently.

DETAILED DESCRIPTION OF PREFERRED EMBODIMENTS

Figure 8:
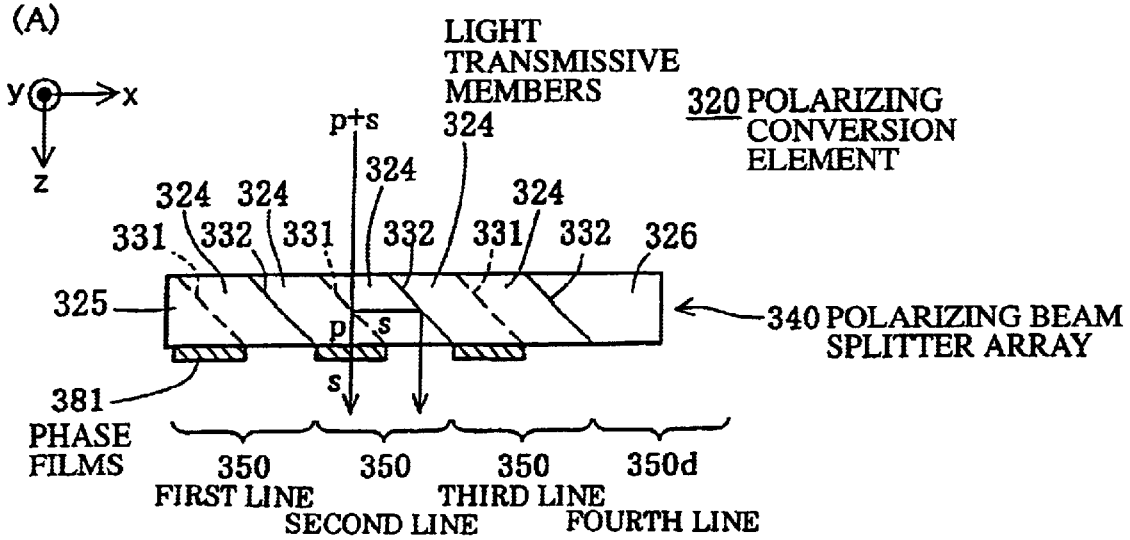
FIGS. 8(A)–(B) include schematic representations for showing a structure of the polarizing conversion element 320.
Figure 8:
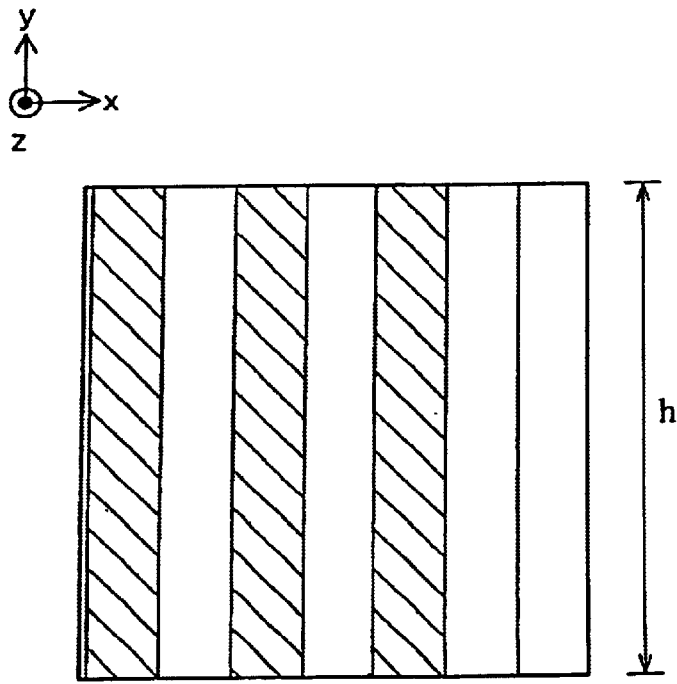

A. A Method for Manufacturing Polarizing Conversion Elements:

A method according to the present invention will be described below by way of an example of manufacturing of the polarizing conversion element 320, shown in FIGS. 8(A)–(B), which may consist of three lines of polarizing light conversion units 350 and one line of a dummy unit 350d. FIGS. 1(A) to 4(C) are schematic representations showing manufacturing processes of the polarizing conversion element 320.

First, k sets of three first glass plates and two second glass plates, and the (k+1) third glass plates 323 are prepared (where "k" is an integer of 2 or greater). The following example will be described as k=2, that is, three third glass plates 323 are prepared.

As shown in FIGS. 1(A) to (C), the first glass plate 321, the second glass plate 322, and the third glass plate 323 are rectangular-shaped glass plates having the longitudinal length "m" and the transverse length "1". The thickness "d2" of the second glass plate 322 is substantially the same as that "d1" of the first glass plate 321. The thickness "d3" of the third glass plate 323 is larger than that "d1" of the first glass plate 321. The meaning of "substantially the same" indicates that differences in the length are not more than several percent. In addition, the thickness "d1" of the first glass plate 321 and that "d2" of the second glass plate 322 are determined by considering the thickness of the optical adhesive 327 so that polarization separating films 331 and reflecting films 332 are arranged at equal intervals when the first glass plate 321 and the second glass plate 322 are alternately bonded to each other, as will be described later.

In addition, the first to third glass plates 321, 322, and 323 are equivalent to the first to third light transmissive plates according to the present invention.

Next, as shown in FIG. 2(A), on one surface of the first glass plate 321, the polarization separating film 331 is formed, while, as shown in FIG. 2(B), on the opposite surface thereof, the reflecting film 332 is formed to form a first glass plate 321a having the polarization separating film 331 and the reflecting film 332 formed thereon.

The polarization separating film 331 may be formed by depositing a dielectric multi-layer film, and the reflecting film 332 may be formed by depositing a dielectric multi-layer film which may be the same as or different from the dielectric multi-layer film for the polarization separating film 331. In addition, the reflecting film 332 may also be formed by an evaporating process of a metallic reflecting film such as aluminum.

Then, as shown in FIG. 3(A), in each of spaces between three third glass plates 323, three first glass plates 321a and two second glass plates 322 are alternately arranged so as to be bonded together by the optical adhesive 327 so that the polarization separating films 331 and the reflecting films 332 are alternately arranged on each of interfaces between glass plates 321, 322, and 323 to form a composite plate member 500. The optical adhesive 327 is cured by irradiation of an ultra violet ray.

By cutting the composite plate member 500 thus produced along first sections c1 (shown by broken lines in the drawing) inclining at a predetermined angle "θ" with the surface of the composite plate member 500 substantially parallel with each other by using a multi-wire saw or a multi-blade saw, for example, a block substrate 520 shown in FIG. 3(B) is cut. Here "the surface of the composite plate member" indicates the surface of the third plates 323 bonded at the both ends. The value "θ" is preferably about 45°. In addition, surfaces parallel with the first sections of the block substrate 520 cut in such a manner are equivalent to a light receiving surface 522 and a light emitting surface 524.

Then as shown in FIG. 4(A), protruding portions (portions of equivalents to the third glass plates 323) on both ends of the block substrate 520 are cut off by a dicing saw or a laser cutting apparatus so that the block substrate 520 has a substantially rectangular shape, to form a substantially rectangular block substrate 520a as shown in FIG. 4(B). After grinding and polishing surfaces of the block substrate 520a, the block substrate 520a is divided at the positions within the portion formed by the third glass plate 323 disposed inside the block substrate 520a by a dicing saw or a laser cutting apparatus to thereby produce two light transmissive blocks 340 (polarizing beam splitter arrays) from the one block substrate 520a, as shown in FIG. 4(C). At this time, although the effectiveness of the economizing steps will be reduced, the surface grinding and polishing may be performed after the division of the substantially rectangular block substrate 520a shown in FIG. 4(B).

On the light emitting surface of the light transmissive block 340 (polarizing beam splitter array) formed as above, the λ/2 phase films 381 are selectively bonded thereon, as shown in FIG. 8(A), thereby enabling the polarizing conversion element 320 to be formed.

Figure 9:
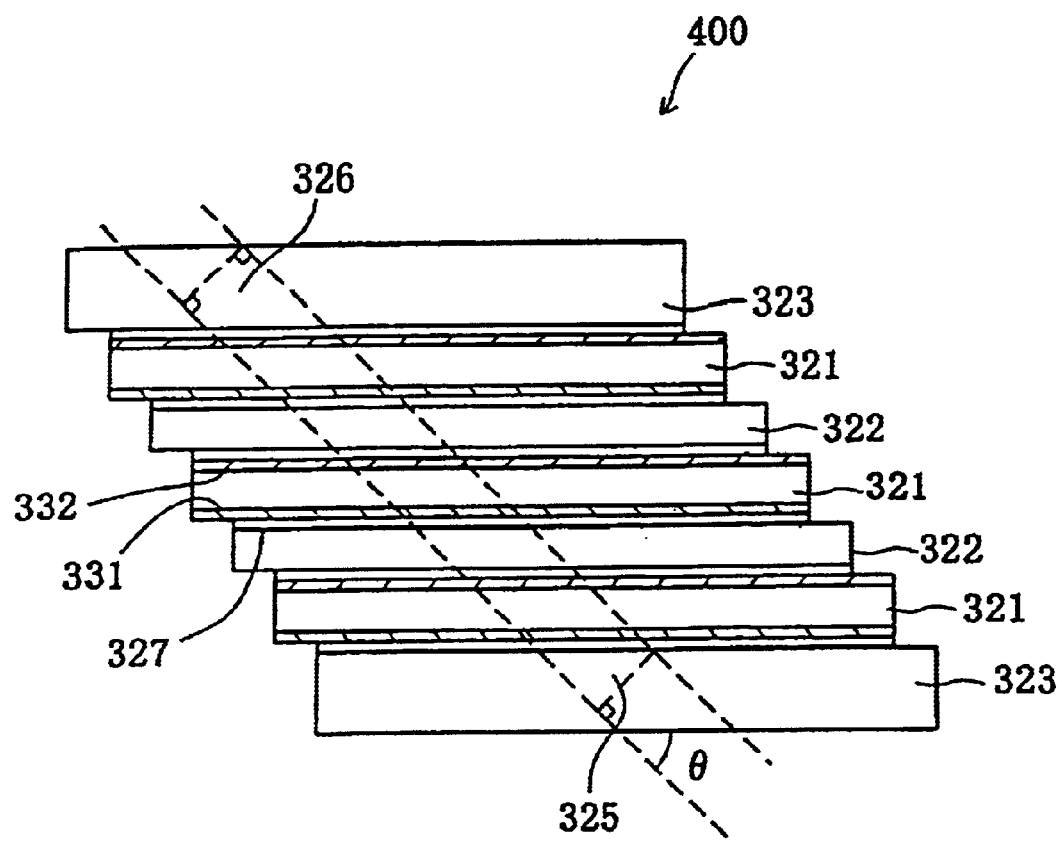
FIG. 9 is a schematic representation for showing a manufacturing method example of a polarizing beam splitter array 340.

In the above-mentioned manufacturing method, the block substrate 520a including two light transmissive blocks 340 is produced from the composite plate member 500. After grinding and polishing the produced block substrate 520a, two light transmissive blocks 340 from one block substrate 520a can be produced. Therefore, one step of cutting the composite plate member 500 and one step of grinding and polishing the light receiving surface 522 and the light emitting surface 524 of the block substrate 520a can be eliminated in comparison with the steps for manufacturing two light transmissive blocks 340 by the conventional manufacturing method (FIG. 9). Accordingly, the light transmissive blocks 340 can be more efficiently manufactured than previously possible. Also, in order to produce the two light transmissive blocks 340 by the conventional manufacturing method, four of the third glass plates 323 (FIG. 9) have to be prepared. However, in the above-mentioned manufacturing method, the number of the required third glass plates 323 can be reduced to be three thereby enabling the number of parts for manufacturing the polarizing conversion element 320 to be reduced, resulting in reduction in the manufacturing cost.

In addition, the manufacturing method has been described in an example in which two light transmissive blocks 340 are produced from one block substrate 520a. However, it is not limited thereto. By preparing three sets of three first glass plates 321 and two second glass plates 322, and four third glass plates 323 to produce a composite plate member, a block substrate including the three light transmissive blocks 340 may be produced from the produced composite plate member. Also, after grinding and polishing the produced composite plate member, the three light transmissive blocks 340 may be produced from one composite plate member. That is, in the above-mentioned manufacturing method, by preparing k sets (herein "k" is referred to an integer of 2 or more) of the three first glass plates 321 and the two second glass plates 322, and the (K+1) third glass plates 323 to produce a composite plate member, a block substrate including the k light transmissive blocks 340 may be produced from the produced composite plate member. After grinding and polishing the produced composite plate member, the k light transmissive blocks 340 may be produced from one composite plate member. In such a manner, the polarizing conversion element 320 can be more efficiently manufactured than being previously possible. Also, the number of the required third glass plates 323 can be reduced to be (K+1) from 2k plates in the conventional manufacturing method, thereby enabling the number of parts for manufacturing the polarizing conversion element to be reduced, resulting in reduction in the manufacturing cost.

Also, the method has been described in the context in which k sets of the three first glass plates 321 and the two second glass plates 322 are prepared. However, it is not limited thereto. K sets of a plurality of first glass plates 321 and a plurality of second glass plates 322 may be prepared. Thereby, the polarizing conversion element having multiple lines of polarizing conversion units can be efficiently manufactured.

In addition, the manufacturing method has been described in the context in which the third glass plates 323 have the same thickness; however, it is not limited thereto. For example, the thickness of the third glass plates 323 disposed at the two ends may be different from that of the third glass plates 323 disposed inside. Also, plates having a different thickness may be used depending on which ends they are disposed on. That is, a third glass plate 323 having different thicknesses may be used depending on the position it is placed in.

Further, the manufacturing method has been described in the context in which the thickness d1 of the first glass plates 321 and the thickness d2 of the second glass plates 322 are substantially the same; however, d1 and/or d2 may be the same with regard to the thickness of the optical adhesive 327. Moreover, the manufacturing method has been described in the context in which the light transmissive block 340 is produced after grinding and polishing the surface of the block substrate 520a; however, the light transmissive block 340 may be produced without grinding and polishing the surface of the block substrate 520a. In the latter case, the surface of the light transmissive block 340 is grinded and polished.

Figure 1:
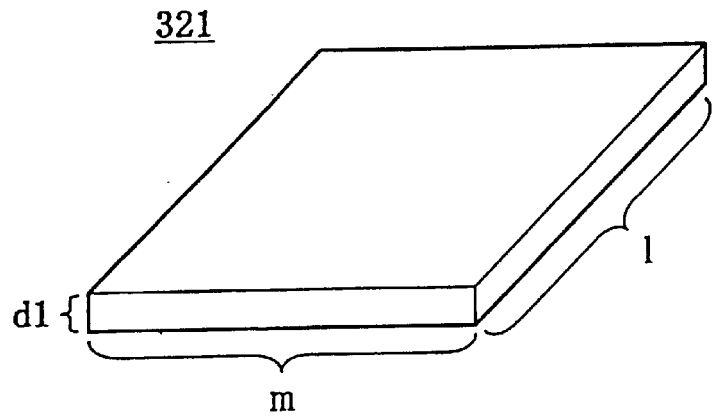
FIGS. 1(A)–(C) include schematic representations showing first to third glass plates 321, 322, and 323 used for manufacturing a polarizing conversion element 320.
Figure 1:
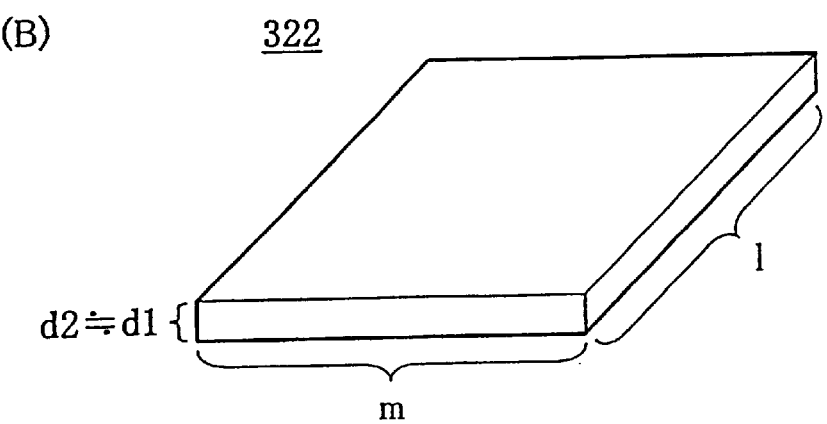
Figure 1:
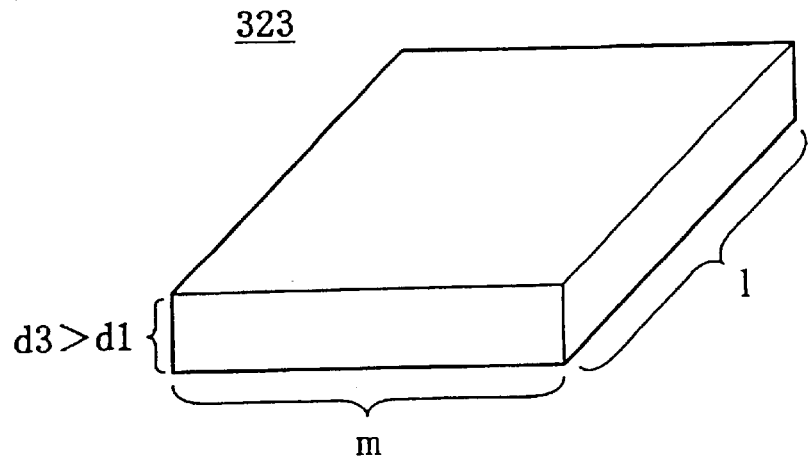
Figure 2:
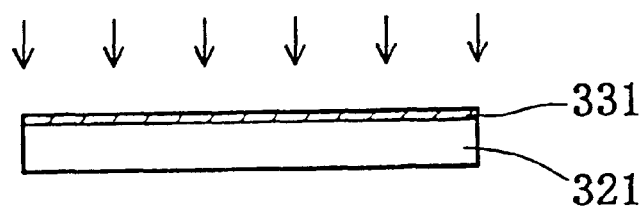
FIGS. 2(A)–(B) include schematic representations showing a process of producing a first glass plate 321a on which a polarization separating film 331 and a reflecting film 332 are formed.
Figure 2:
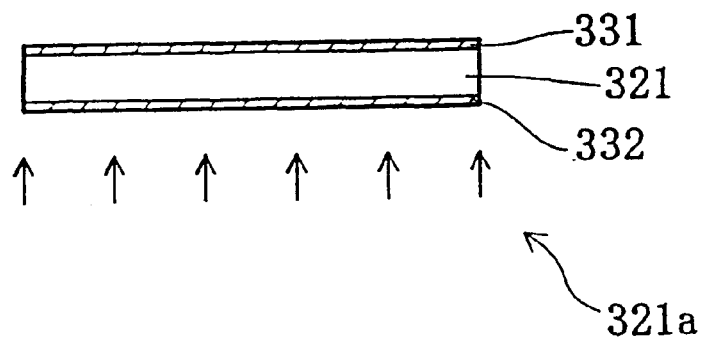
Figure 3:
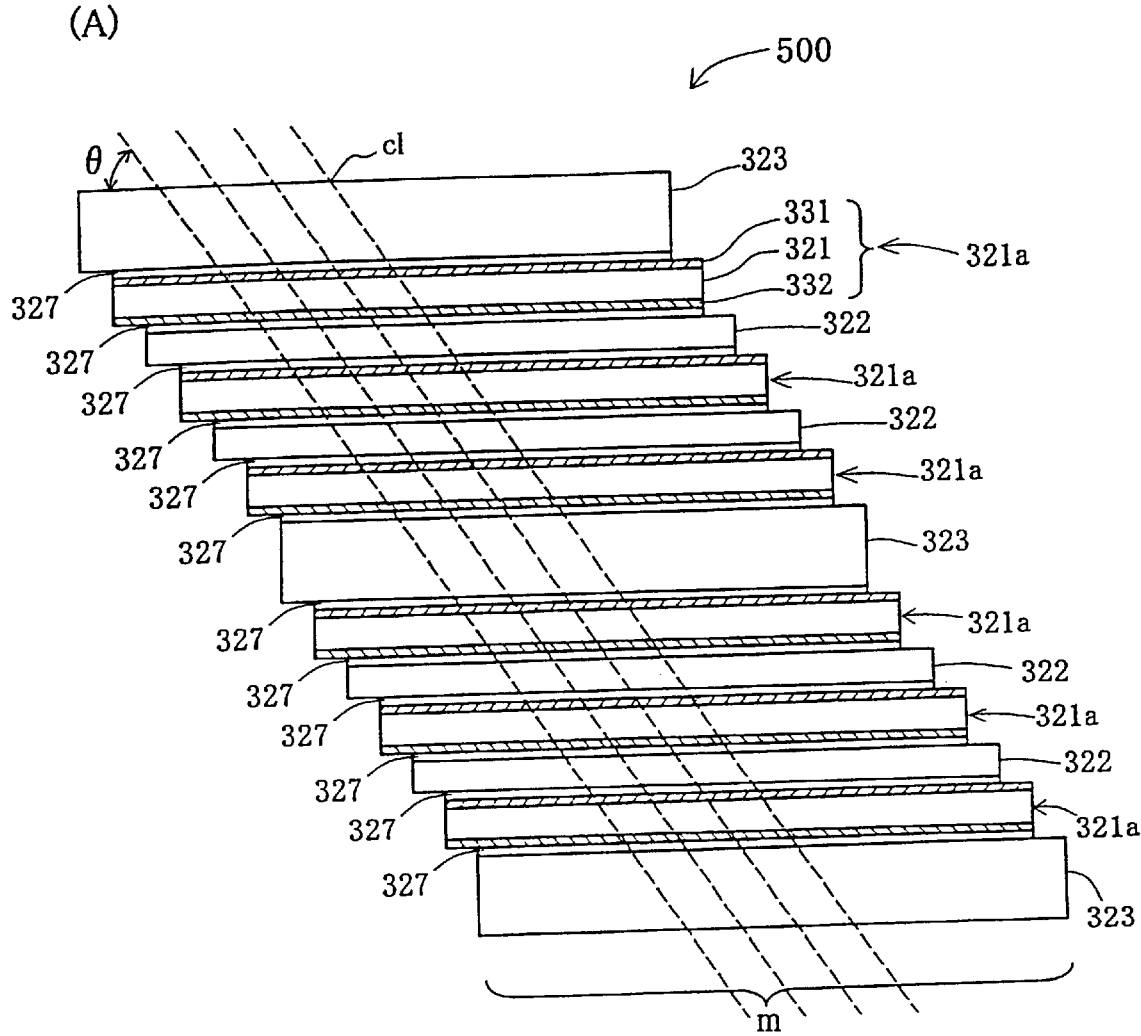
FIGS. 3(A)–(B) include schematic representations showing a process of producing a composite plate member 500 so as to produce a block substrate 520.
Figure 3:
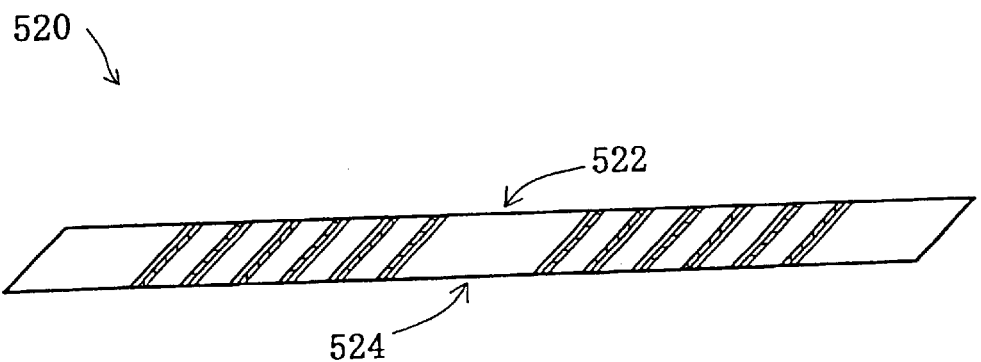
Figure 4:
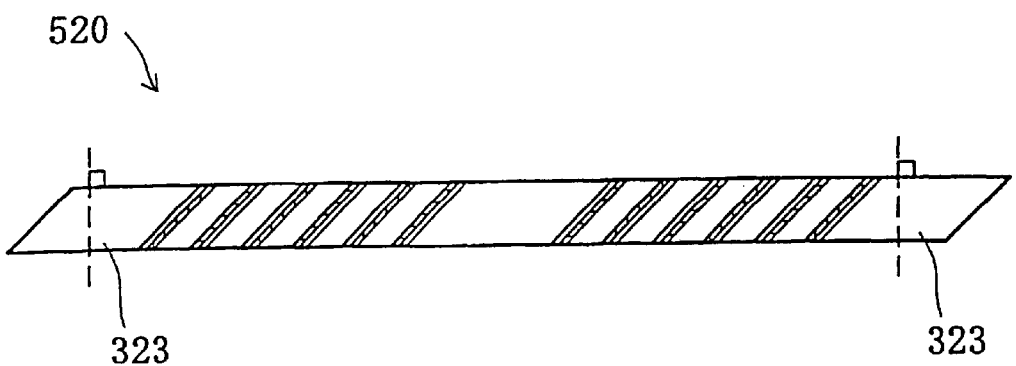
FIGS. 4(A)–(C) include schematic representations showing a process of producing light transmissive blocks 340 from the block substrate 520.
Figure 4:
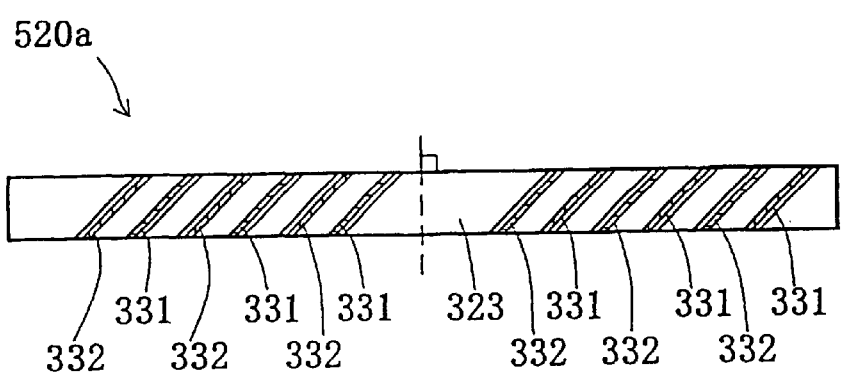
Figure 4:
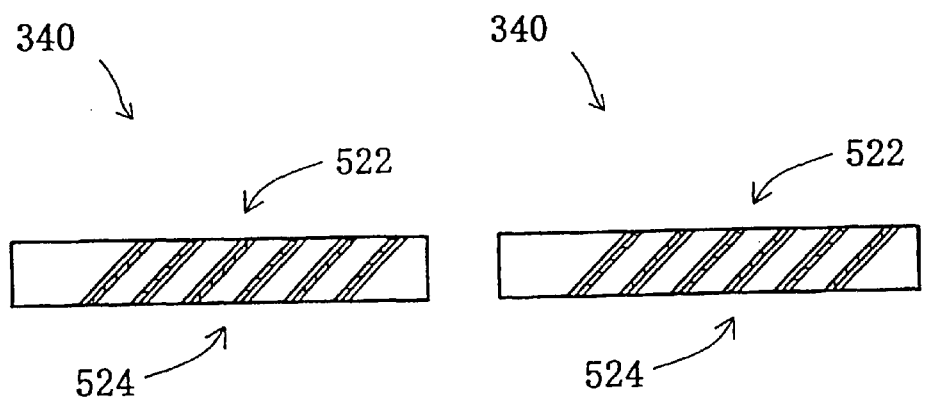
Figure 5:
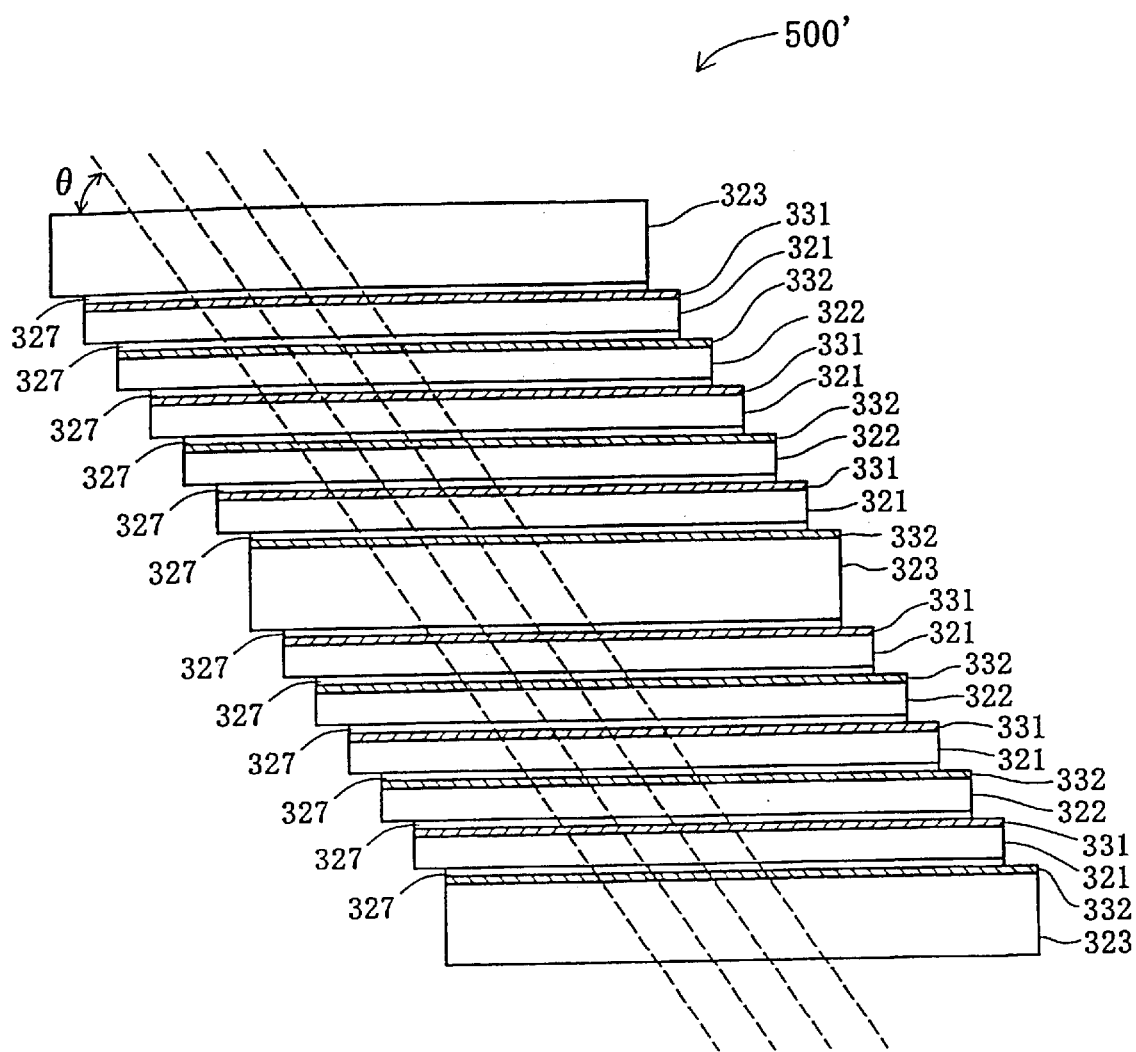
FIG. 5 is a schematic representation showing another method for manufacturing the composite plate member 500 shown in FIGS. 3(A)–(B).

FIG. 5 is a schematic representation showing a different manufacturing method for the composite plate member 500 shown in FIG. 3. This is a method for forming and bonding the reflecting film 332 to the surface of the second glass plate 322 and the third glass plate 323 in FIGS. 3(A)–(B) that is attached via optical adhesive 327 to the side of the first glass plate 321a where reflecting film 332 is.

By this method, substantially the same composite plate member 500' as the composite plate member 500 shown in FIG. 3 can also be manufactured. In addition, the composite plate member 500' has the same functions except for having the different positional relationship between the reflecting film 332 and the optical adhesive 327.

Figure 6:
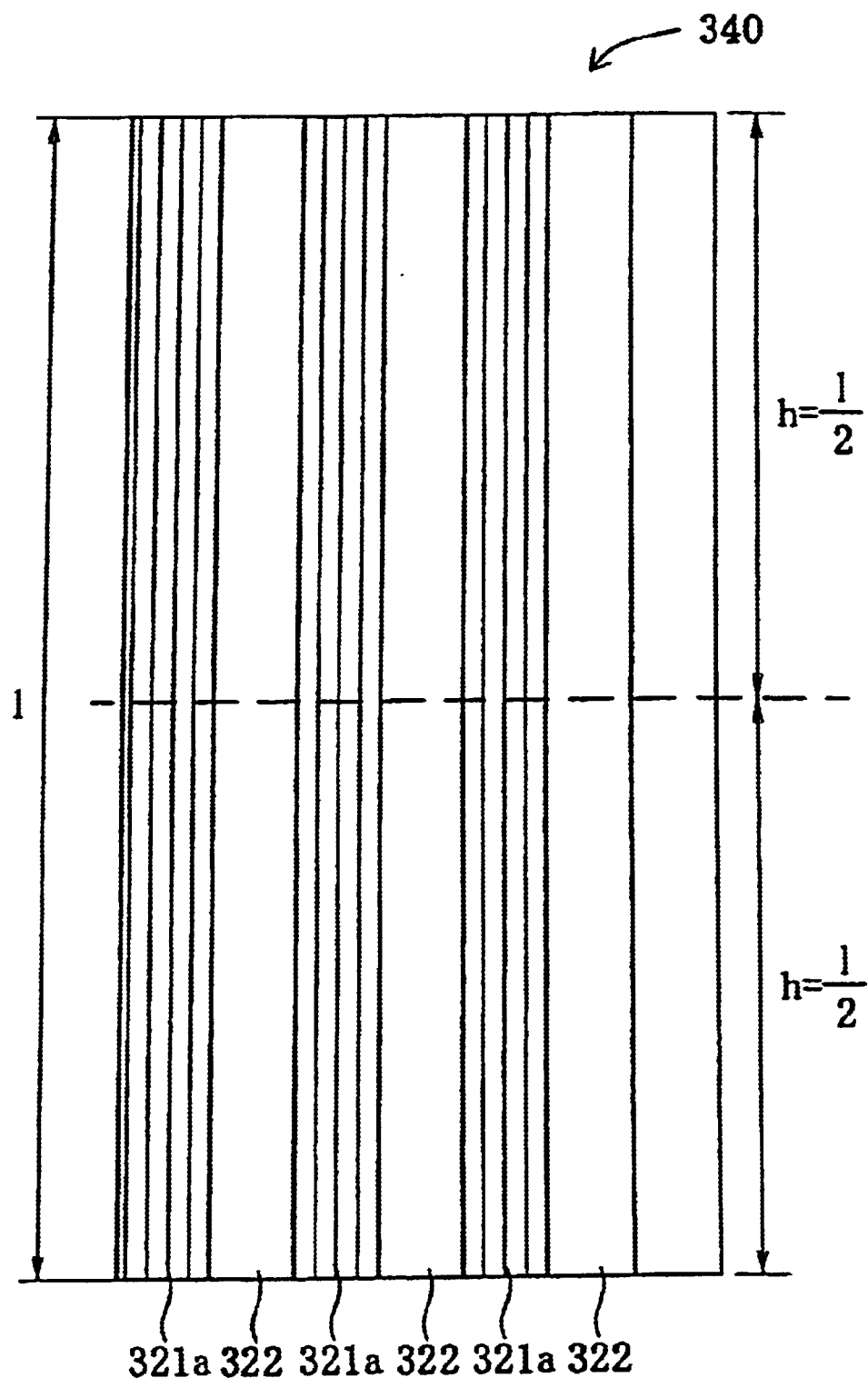
FIG. 6 is a front view of the light transmissive block 340.

FIG. 6 is a front view of the light transmissive block 340 manufactured by the above-mentioned manufacturing method. When the light transmissive block 340 manufactured by the manufacturing method is cut, by a dicing saw or a laser cutting apparatus, parallel to a second section substantially parallel to the direction in which the polarization separating films 331 and the reflecting films 332 are arranged, a plurality of light transmissive blocks 340 can be further manufactured. For example, when the height "h" of the polarizing conversion element 320 is ½ of the height "1" of the light transmissive block 340, two light transmissive blocks can be manufactured by dividing the light transmissive block 340 into two.

In this method, as well as the foregoing method, k sets of the three first glass plates 321 and the two second glass plates 322 are prepared; however, the method is not limited thereto. K sets of a plurality of first glass plates 321 and a plurality of second glass plates 322 may be prepared. Thereby, the polarizing conversion element having multiple lines of polarizing conversion units can be efficiently manufactured. In addition, in this method, the third glass plates 323 have the same thickness; however, the method is not limited thereto. For example, the thickness of the third glass plates 323 disposed at the two ends may be different from that of the third glass plates 323 disposed inside. Also, plates having different thicknesses may be used depending on which ends they are disposed on. That is, third glass plates 323 having different thicknesses may be used depending on the position they are placed in.

Further, in this method, the thickness d1 of the first glass plates 321 and the thickness d2 of the second glass plates 322 are substantially the same; however, d1 and/or d2 may be the same with regard to the thickness of the optical adhesive 327. Moreover, in this method, the light transmissive block 340 is produced after grinding and polishing the surface of the block substrate 520a; however, the light transmissive block 340 may be produced without grinding and polishing the surface of the block substrate 520a. In the latter case, the surface of the light transmissive block 340 is grinded and polished.

Figure 7:
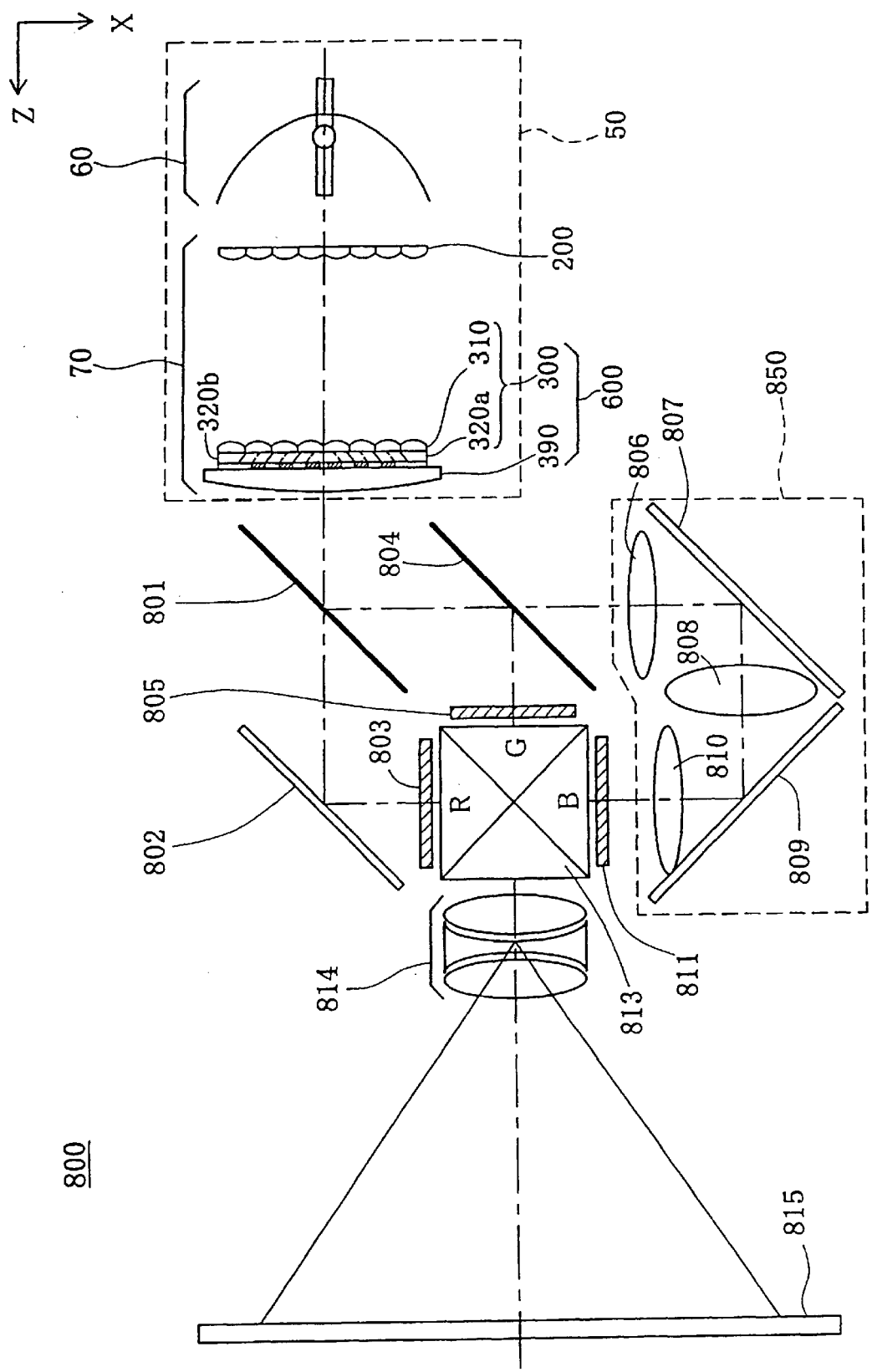
FIG. 7 is a block diagram showing a principal part of a projector which may consist of a polarizing conversion element produced by the manufacturing method according to the present invention.

B. A Structure of Projector:

FIG. 7 is a block diagram showing a principal part of a projector which may consist of a polarizing conversion element produced by the manufacturing method according to the present invention. The projector 800 may consist of a polarization-illuminating device 50, dichroic mirrors 801 and 804, a reflecting mirror 802, a light guide 850 consisting of relay lenses 806, 808, and 810, and reflecting mirrors 807 and 809, three light valves 803, 805, and 811, a cross-dichroic prism 813, and a projection lens 814.

The polarization-illuminating device 50 may consist of a light-source unit 60 and a polarized-light generating device 70. The light-source unit 60 emits non-polarized light including an S-polarized light component and a P-polarized light component. The light emitted from the light-source unit 60 is converted by the polarized-light generating device 70 into specific linearly polarized light (S-polarized light in this embodiment) having a substantially aligned polarizing direction, to illuminate an illumination region. The three light valves 803, 805, and 811 are equivalent to the illumination region.

The polarized-light generating device 70 may consist of a first optical component 200 and a second optical component 600. The first optical component 200 is a lens array arranged in a matrix of small lenses having a rectangular profile. The second optical component 600 may consist of an optical element 300 and an emitting-side lens 390.

The optical element 300 may consist of a condensing lens array 310 and two polarizing conversion elements 320a and 320b. The condensing lens array 310 is of the same structure as that of the first optical component 200, and is arranged in the direction opposing the first optical component 200. The condensing lens array 310 has a function, together with the first optical component 200, for respectively condensing plural partial light beams divided by each small lens 201 of the first optical component 200 to guide them toward incident regions of polarizing conversion elements 320a and 320b. The polarizing conversion elements 320a and 320b are formed by arranging the polarizing conversion elements 320 (FIG. 8) produced by the manufacturing method according to the present invention so that respective polarization separating films 331 and respective reflecting films 332 symmetrically oppose each other about the optical axis, by sandwiching it. Therefore, the light beam emitted from the light-source unit 60 is converted into substantially specific linearly polarized light (S-polarized light in this embodiment) by the polarized-light generating device 70.

The emitting-side lens 390 has a function for superimposing each of plural sub light beams emitted from the optical element 300 on respective liquid-crystal light-valves 803, 805, and 811.

The light emitted from the polarization-illuminating device 50 is separated into colored light beams of three colors, red, green, and blue by the dichroic mirrors 801 and 804 as a color separating optical system. Each of separated colored light beams of the three colors is modulated corresponding to given image information (image signals) by respective liquid-crystal light-valves 803, 805, and 811 for each color. These liquid-crystal light-valves 803, 805, and 811 correspond to the light-modulating device according to the present invention. Each of modulated colored light beams by the liquid-crystal light-valves 803, 805, and 811 is combined by the cross-dichroic prism 813 as a color synthesizing optical system to be projected onto a screen 815 by the projection lens 814 as a projection optical system. Thereby, color images are displayed on the screen 815. In addition, the structure and the function of each unit of the projector shown in FIG. 7 are disclosed in detail by the applicant of this application in Japanese Unexamined Patent Application Publication No. 10-177151, for example, so that the description thereof is not given in this application.

Since the polarizing conversion elements 320a and 320b produced by the manufacturing method according to the present invention are used in the polarization-illuminating device 50 of the projector 800, the manufacturing cost of the apparatus can be reduced.

While the projector 800 shown in FIG. 7 has been described with reference to an example in which the polarizing conversion element produced by the manufacturing method according to the present invention is used in the polarization-illuminating device in a projector for displaying color images, it is apparent that the element is not so limited, but can be applied to various devices. For example, it may be applied to a projector for projecting monochromatic images. In this case, in the apparatus shown in FIG. 7, one liquid-crystal light-valve is only needed, and the color separation optical system for separating the light into colored beams of three colors and the color synthesizing optical system for combining colored beams of three colors can be eliminated. Furthermore, the present invention can be applied to a projector using only one light valve. Also, the present invention can be applied to an image display apparatus using illuminating polarized-light such as a projector using a reflection-type liquid-crystal light-valve and a rear-type display apparatus.

In addition, the present invention is not limited to the above-described examples and embodiments, and it is intended to embrace all such variations and modifications that fall within the spirit and scope of the invention.

What is claimed is:

1. A method for manufacturing a polarizing beam splitter array that comprises a polarizing conversion element that converts non-polarized light into specified polarized light, said method comprising:

preparing k sets of light transmissive members, k being an integer of 2 or greater, each of the sets comprising a plurality of first light transmissive plates and a plurality of second light transmissive plates;

preparing (k+1) third light transmissive plates having a greater thickness than those of the first light transmissive plates and the second light transmissive plates;

producing a composite plate member by alternately arranging and bonding one set of the plurality of first light transmissive plates and the plurality of second light transmissive plates to each of spaces between the (k+1) third light transmissive plates, and alternately arranging a plurality of polarization separating films and a plurality of reflecting films in each interface between the first light transmissive plates, the second light transmissive plates and the third light transmissive plates in the composite plate member;

producing a block substrate having a light receiving surface and a light emitting surface by cutting the composite plate member along a first section parallel to a surface inclining at a predetermined angle "θ" with a surface of the composite plate member, the light receiving surface and the light emitting surface being in parallel to the first section;

polishing the light receiving surface and the light emitting surface of the block substrate; and producing k polarizing beam splitter arrays from one of the block substrates by dividing the block substrate along a plane that is perpendicular to the first section at positions of the third light transmissive plates that are disposed inside the block substrate.

2. The method according to claim 1, preparing the k sets of light transmissive members comprising:

forming the polarization separating film on a first surface of the first light transmissive plate; and forming the reflecting film on a second surface of the first light transmissive plate.

3. The method according to claim 1, preparing the k sets of light transmissive members comprising:

forming the polarization separating film on one surface of the first light transmissive plate; and forming the reflecting film on one surface of the second light transmissive plate.

4. A method or manufacturing a polarizing beam splitter array that comprises a polarizing conversion element that converts non-polarized light into specified polarized light, said method comprising:

preparing k sets of light transmissive members, k being an integer of 2 or greater, each of the sets comprising a plurality of first light transmissive plates and a plurality of second light transmissive plates;

preparing (k+1) third light transmissive plates having a greater thickness than those of the first light transmissive plates and the second light transmissive plates;

producing a composite plate member by alternately arranging and bonding one set of the plurality of first light transmissive plates and the plurality of second light transmissive plates to each of spaces between the (k+1) third light transmissive plates, and alternately arranging a plurality of polarization separating films and a plurality of reflecting films in each interface between the first light transmissive plates, the second light transmissive plates and the third light transmissive plates in the composite plate member;

producing a block substrate having a light receiving surface and a light emitting surface by cutting the composite plate member along a first section parallel to a surface inclining at a predetermined angle "θ" with a surface of the composite plate member, the light receiving surface and the light emitting surface being in parallel to the first section; and producing k polarizing beam splitter arrays from one of the block substrates by dividing the block substrate along a plane that is perpendicular to the first section at positions of the third light transmissive plates that are disposed inside the block substrate.

5. The method according to claim 4, preparing the k sets of light transmissive members comprising:

forming the polarization separating film on a first surface of the first light transmissive plate; and forming the reflecting film on a second surface of the first light transmissive plate.

6. The method according to claim 4, preparing the k sets of light transmissive members comprising:

forming the polarization separating film on one surface of the first light transmissive plate; and forming the reflecting film on one surface of the second light transmissive plate.

7. A method for manufacturing a polarizing conversion element that converts non-polarized light into specified polarized light, said method comprising:

preparing k sets of light transmissive members, k being an integer of 2 or greater, each of the sets comprising a plurality of first light transmissive plates and a plurality of second light transmissive plates;

preparing (k+1) third light transmissive plates having a greater thickness than those of the first light transmissive plates and the second light transmissive plates;

producing a composite plate member by alternately arranging and bonding one set of the plurality of first light transmissive plates and the plurality of second light transmissive plates to each of spaces between the (k+1) third light transmissive plates, and alternately arranging a plurality of polarization separating films and a plurality of reflecting films in each interface between the first light transmissive plates, the second light transmissive plates and the third light transmissive plates in the composite plate member;

producing a block substrate having a light receiving surface and a light emitting surface by cutting the composite plate member along a first section parallel to a surface inclining at a predetermined angle "θ" with a surface of the composite plate member, the light receiving surface and the light emitting surface being in parallel to the first section;

polishing the light receiving surface and the light emitting surface of the block substrate;

producing k polarizing beam splitter arrays from one of the block substrates by dividing the block substrate along a plane that is perpendicular to the first section at positions of the third light transmissive plates that are disposed inside the block substrate; and producing the polarizing conversion element by selectively bonding λ/2 phase films on the light emitting surface of the polarizing beam splitter array.

8. The method according to claim 7, preparing the k sets of light transmissive members comprising:

forming the polarization separating film on a first surface of the first light transmissive plate; and forming the reflecting film on a second surface of the first light transmissive plate.

9. The method according to claim 7, preparing the k sets of light transmissive members comprising:

forming the polarization separating film on one surface of the first light transmissive plate; and forming the reflecting film on one surface of the second light transmissive plate.

10. A method for manufacturing a polarizing conversion element that converts non-polarized light into specified polarized light, said method comprising:

preparing k sets of light transmissive members, k being an integer of 2 or greater, each of the sets comprising a plurality of first light transmissive plates and a plurality of second light transmissive plates;

preparing (k+1) third light transmissive plates having a greater thickness than those of the first light transmissive plates and the second light transmissive plates;

producing a composite plate member by alternately arranging and bonding one set of the plurality of first light transmissive plates and the plurality of second light transmissive plates to each of spaces between the (k+1) third light transmissive plates, and alternately arranging a plurality of polarization separating films and a plurality of reflecting films in each interface between the first light transmissive plates, the second light transmissive plates and the third light transmissive plates in the composite plate member;

producing a block substrate having a light receiving surface and a light emitting surface by cutting the composite plate member along a first section parallel to a surface inclining at a predetermined angle "θ" with a surface of the composite plate member, the light receiving surface and the light emitting surface being in parallel to the first section;

producing k polarizing beam splitter arrays from one of the block substrates by dividing the block substrate along a plane that is perpendicular to the first section at positions of the third light transmissive plates that are disposed inside the block substrate; and producing the polarizing conversion element by selectively bonding λ/2 phase films on the light emitting surface of the polarization beam splitter array.

11. The method according to claim 10, preparing the k sets of light transmissive members comprising:

forming the polarization separating film on a first surface of the first light transmissive plate; and forming the reflecting film on a second surface of the first light transmissive plate.

12. The method according to claim 10, preparing the k sets of light transmissive members comprising:

forming the polarization separating film on one surface of the first light transmissive plate; and forming the reflecting film on one surface of the second light transmissive plate.

13. A method for manufacturing a polarizing beam splitter array that comprises a polarizing conversion element that converts non-polarized light into specified polarized light, said method comprising:

preparing a set of light transmissive members, comprising a plurality of first light transmissive plates and a plurality of second light transmissive plates;

preparing two third light transmissive plates having a greater thickness than those of the first light transmissive plates and the second light transmissive plates;

producing a composite plate member by alternately arranging and bonding one set of the plurality of first light transmissive plates and the plurality of second light transmissive plates between the two third light transmissive plates, and alternately arranging a plurality of polarization separating films and a plurality of reflecting films in each interface between the first light transmissive plates, the second light transmissive plates and the third light transmissive plates in the composite plate member;

producing a block substrate having a light receiving surface and a light emitting surface by cutting the composite plate member along a first section parallel to a surface inclining at a predetermined angle with a surface of the composite plate member, the light receiving surface and the light emitting surface being in parallel to the first section;

polishing the light receiving surface and the light emitting surface of the block substrate; and dividing a polarizing beam splitter array into a plurality of polarizing beam splitter arrays by cutting the polarizing beam splitter array along a second section in parallel with a surface substantially perpendicular to a longitudinal direction of the plurality of polarization separating films and the plurality of reflecting films arranged inside the polarizing beam splitter array.

14. The method according to claim 13, preparing the set of light transmissive members comprising:

forming the polarization separating film on a first surface of the first light transmissive plate; and forming the reflecting film on a second surface of the first light transmissive plate.

15. The method according to claim 13, preparing the set of light transmissive members comprising:

forming the polarization separating film on one surface of the first light transmissive plate; and forming the reflecting film on one surface of the second light transmissive plate.

16. A method for manufacturing a polarizing beam splitter array that comprises a polarizing conversion element that converts non-polarized light into specified polarized light, said method comprising:

preparing a set of light transmissive members, comprising a plurality of first light transmissive plates and a plurality of second light transmissive plates;

preparing two third light transmissive plates having a greater thickness than those of the first light transmissive plates and the second light transmissive plates;

producing a composite plate member by alternately arranging and bonding one set of the plurality of first light transmissive plates and the plurality of second light transmissive plates to each of spaces between the two third light transmissive plates, and alternately arranging a plurality of polarization separating films and a plurality of reflecting films in each interface between the first light transmissive plates, the second light transmissive plates and the third light transmissive plates in the composite plate member;

producing a block substrate having a light receiving surface and a light emitting surface by cutting the composite plate member along a first section parallel to a surface inclining at a predetermined angle with a surface of the composite plate member, the light receiving surface and the light emitting surface being in parallel to the first section;

producing a polarizing beam splitter array from one of the block substrates by dividing the block substrate at positions of the third light transmissive plates that are disposed inside the block substrate; and dividing the polarizing beam splitter array into a plurality of polarizing beam splitter arrays by cutting the light transmissive block along a second section in parallel with a surface substantially perpendicular to a longitudinal direction of the plurality of polarization separating films and the plurality of reflecting films arranged inside the light transmissive block.

17. The method according to claim 16, preparing the set of light transmissive members comprising:

forming a polarization separating film on a first surface of the first light transmissive plate; and forming a reflecting film on a second surface of the first light transmissive plate.

18. The method according to claim 16, preparing the set of light transmissive members comprising:

forming a polarization separating film on one surface of the first light transmissive plate; and forming a reflecting film on one surface of the second light transmissive plate.

19. A method for manufacturing a polarizing conversion element that converts non-polarized light into specified polarized light, said method comprising:

preparing a set of light transmissive members, comprising a plurality of first light transmissive plates and a plurality of second light transmissive plates;

preparing two third light transmissive plates having a greater thickness than those of the first light transmissive plates and the second light transmissive plates;

producing a composite plate member by alternately arranging and bonding one set of the plurality of first light transmissive plates and the plurality of second light transmissive plates between the two third light transmissive plates, and alternately arranging a plurality of polarization separating films and a plurality of reflecting films in each interface between the first light transmissive plates, the second light transmissive plates and the third light transmissive plates in the composite plate member;

producing a block substrate having a light receiving surface and a light emitting surface by cutting the composite plate member along a first section parallel to a surface inclining at a predetermined angle with a surface of the composite plate member, the light receiving surface and the light emitting surface being in parallel to the first section;

polishing the light receiving surface and the light emitting surface of the block substrate;

dividing a polarizing beam splitter array into a plurality of polarizing beam splitter arrays by cutting the polarizing beam splitter array along a second section in parallel with a surface substantially perpendicular to a longitudinal direction of the plurality of polarization separating films and the plurality of reflecting films arranged inside the polarizing beam splitter array; and producing the polarizing conversion element by selectively bonding $\lambda/2$ phase films on the light emitting surface of the polarizing beam splitter array.

20. The method according to claim 19, preparing the set of light transmissive members comprising:

forming a polarization separating film on a first surface of the first light transmissive plate; and forming a reflecting film on a second surface of the first light transmissive plate.

21. The method according to claim 19, preparing the set of light transmissive members comprising:

forming a polarization separating film on one surface of the first light transmissive plate; and forming a reflecting film on one surface of the second light transmissive plate.

22. A method for manufacturing a polarizing conversion element that converts non-polarized light into specified polarized light, said method comprising:

preparing a set of light transmissive members, comprising a plurality of first light transmissive plates and a plurality of second light transmissive plates;

preparing two third light transmissive plates having a greater thickness than those of the first light transmissive plates and the second light transmissive plates;

producing a composite plate member by alternately arranging and bonding one set of the plurality of first light transmissive plates and the plurality of second light transmissive plates to each of spaces between the two third light transmissive plates, and alternately arranging a plurality of polarization separating films and a plurality of reflecting films in each interface between the first light transmissive plates, the second light transmissive plates and the third light transmissive plates in the composite plate member;

producing a block substrate having a light receiving surface and a light emitting surface by cutting the composite plate member along a first section parallel to a surface inclining at a predetermined angle with a surface of the composite plate member, the light receiving surface and the light emitting surface being in parallel to the first section;

producing a polarizing beam splitter array from one of the block substrates by dividing the block substrate at positions of the third light transmissive plates that are disposed inside the block substrate; and dividing the polarizing beam splitter array into a plurality of polarizing beam splitter arrays by cutting the light transmissive block along a second section in parallel with a surface substantially perpendicular to a longitudinal direction of the plurality of polarization separating films and the plurality of reflecting films arranged inside the light transmissive block; and producing the polarizing conversion element by selectively bonding $\lambda/2$ phase films on the light emitting surface of the polarizing beam splitter array.

23. The method according to claim 22, preparing the set of light transmissive members comprising:

forming a polarization separating film on a first surface of the first light transmissive plate; and forming a reflecting film on a second surface of the first light transmissive plate.

24. The method according to claim 22, preparing the set of light transmissive members comprising:

forming a polarization separating film on one surface of the first light transmissive plate; and forming a reflecting film on one surface of the second light transmissive plate.

* * * * *